United States Patent
Daga (10) Patent No.: US 8,015,210 B2
(45) Date of Patent: Sep. 6, 2011

(54) METHOD AND SYSTEM FOR GENERATING STRING-BASED ADDRESSES

(75) Inventor: Rakshit Daga, Sunnyvale, CA (US)

(73) Assignee: SAP AG, Walldorf (DE)

( * ) Notice: Subject to any disclaimer, the term of this patent is extended or adjusted under 35 U.S.C. 154(b) by 367 days.

(21) Appl. No.: 11/646,173

(22) Filed: Dec. 27, 2006

(65) Prior Publication Data

US 2008/0162553 A1  Jul. 3, 2008

(51) Int. Cl.
*G06F 17/30* (2006.01)
(52) U.S. Cl. .................. 707/796; 707/960
(58) Field of Classification Search ........... 707/101, 707/102, 103 Y, 103 R, 103 X, 103 Z, 104.1, 707/999.1, 999.101, 999.102, 999.103, 796, 707/960
See application file for complete search history.

(56) References Cited

U.S. PATENT DOCUMENTS

| | | | |
|---|---|---|---|
| 5,293,615 A | | 3/1994 | Amada |
| 5,499,371 A * | | 3/1996 | Henninger et al. ........... 717/108 |
| 5,799,309 A * | | 8/1998 | Srinivasan .................... 707/102 |
| 5,819,282 A | | 10/1998 | Hooper et al. ............. 707/103 R |
| 5,838,965 A * | | 11/1998 | Kavanagh et al. ......... 707/103 R |
| 5,893,125 A | | 4/1999 | Shostak |
| 6,047,284 A * | | 4/2000 | Owens et al. ..................... 707/4 |
| 6,317,750 B1 | | 11/2001 | Tortolani et al. |
| 6,507,846 B1 * | | 1/2003 | Consens ....................... 707/100 |
| 6,839,719 B2 | | 1/2005 | Wallace |
| 7,026,502 B2 | | 4/2006 | Benderly et al. |
| 7,062,502 B1 | | 6/2006 | Kesler |
| 7,529,727 B2 | | 5/2009 | Arning et al. |
| 2003/0028545 A1 * | | 2/2003 | Wang et al. ................... 707/100 |
| 2003/0115207 A1 | | 6/2003 | Bowman et al. |
| 2003/0180718 A1 | | 9/2003 | Pillutla et al. |
| 2003/0204511 A1 | | 10/2003 | Brundage et al. |
| 2004/0064458 A1 * | | 4/2004 | Hagarty ........................ 707/100 |
| 2004/0139116 A1 * | | 7/2004 | Porter ......................... 707/104.1 |
| 2004/0181543 A1 * | | 9/2004 | Wu et al. ....................... 707/102 |
| 2006/0259509 A1 | | 11/2006 | Stolte et al. |
| 2007/0274154 A1 | | 11/2007 | Simon et al. |
| 2008/0016041 A1 | | 1/2008 | Frost et al. |
| 2008/0162532 A1 | | 7/2008 | Daga |
| 2009/0031230 A1 | | 1/2009 | Kesler |

OTHER PUBLICATIONS

Final Office Action for Application No. 11/646,175, mailed on Jun. 4, 2010, 51 pages.
Office Action for U.S. Appl. No. 11/646,175, mailed on Nov. 17, 2009, 33 pages.
Office Action for U.S. Appl. No. 11/646,175, mailed on Jun. 4, 2010, 43 pages.

* cited by examiner

*Primary Examiner* — James Trujillo
*Assistant Examiner* — Jorge A Casanova
(74) *Attorney, Agent, or Firm* — Brake Hughes Bellermann LLP (57) ABSTRACT

A method and system are described that may generate and process address strings, for example, for database entities such as objects. An example method may include generating a first address string representing a first relational path associated with a first database query retrieval of a first object, and storing the first address string in association with the first object. Another example method may include receiving a query requesting information associated with an entity related to one or more objects included in a database. The method may further include retrieving a first address string based on a search of address strings to determine address strings that indicate the entity, the first address string representing a first relational path associated with a database query retrieval of a first object, and retrieving the first object based on the retrieved first address string.

24 Claims, 6 Drawing Sheets

METHOD AND SYSTEM FOR GENERATING STRING-BASED ADDRESSES

TECHNICAL FIELD

This description relates to information storage and retrieval techniques.

BACKGROUND

Storing and retrieving information quickly and efficiently has conventionally been a challenge, for example, with respect to business tasks in companies. As databases have expanded, computing power has increased, and storage costs have gone down. Conventional storage and retrieval techniques have focused on minimizing storage requirements, sometimes at the expense of higher computing times.

With regard to conventional relational databases, records or database objects may be stored in tables based on a unique identifier for each record or object. Database entities may be related to each other via various relationships which may be reflected, for example, via columns having common names. For example, a "person" object may include a particular set of "person" attributes, and the "person" may include an "is-a" relationship with a "manager" entity. The "manager" may have a "manager-of" relationship with another "person" object. Thus, there may exist an object hierarchy such that a meaningful response to a query may require a navigation of an object tree which may involve retrieving objects at each node of the navigation, which may be very time-consuming.

For example, when a user submits a query to a relational database system, the database system may process the query by performing various operations on the tables in the database, which may include a very time-consuming JOIN operation, which may require that all objects of all tables included in the JOIN be retrieved in order to determine which objects satisfy certain common attributes. For example, a query such as "Find all objects of Type A which contain in their hierarchy an object of type B with a certain value," for example, "Find all 'contracts' that have 'parties' with name 'SAP'" may be slow to process using conventional techniques because the conventional techniques may include the following steps: A) find all objects of Type B with the value; and B) navigate the hierarchy of B to get to A.

A typical example user may spend 10% of his/her computing time in storing information, and 90% of his/her computing time in retrieving information from previously stored information. Thus, it may be desirable to provide storage and retrieval techniques which improve the efficiency and speed of retrieval of information.

SUMMARY

According to one general aspect, a method includes generating a first address string representing a first relational path associated with a first database query retrieval of a first object included in a database. The method further includes storing the first address string in association with the first object.

According to another aspect, a method includes receiving a query requesting information associated with an entity related to one or more objects included in a database. The method further includes retrieving a first address string based on a search of address strings to determine address strings that indicate the entity, the first address string representing a first relational path associated with a first database query retrieval of a first object. The method further includes retrieving the first object based on the retrieved first address string.

According to another aspect, a method is provided for querying relational information associated with a first data object stored in a relational database. The method includes generating a plurality of relational strings representing a plurality of relationships between the first data object and one or more other data objects also stored in association with the relational database. The method further includes storing the plurality of the relational strings in association with the first object, and in response to a query related to the relational information between the first data object and at least one of the one or more other data objects, searching the stored plurality of the relational strings to retrieve results of the query.

According to yet another aspect, a system includes an address string generator configured to generate a first address string representing a first relational path associated with a first database query retrieval of a first object included in a database. The system further includes a storage engine configured to store the first address string in association with the first object.

According to yet another aspect, a computer program product is tangibly embodied on a computer-readable medium and is configured to cause a data processing apparatus to generate a first address string representing a first relational path associated with a first database query retrieval of a first object included in a database, and store the first address string in association with the first object.

The details of one or more implementations are set forth in the accompanying drawings and the description below. Other features will be apparent from the description and drawings, and from the claims.

DETAILED DESCRIPTION

Figure 1:
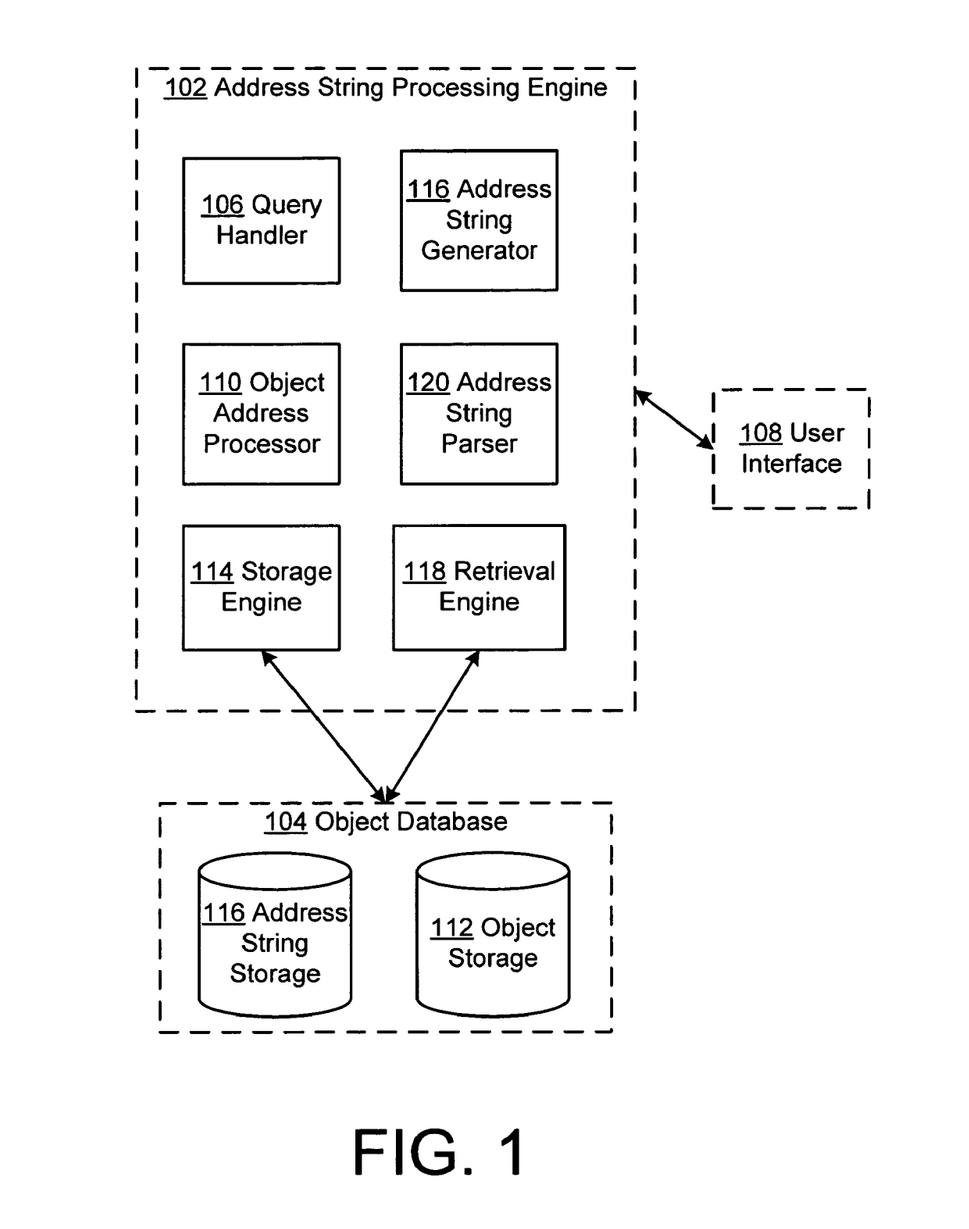
FIG. 1 is a block diagram of an example system for generating and processing address strings.

FIG. 1 is a block diagram of a system 100 for generating and processing address strings. In the example of FIG. 1, an address string processing engine 102 includes various processing engines that provide and process address strings that may be stored in association with objects, for example, objects associated with databases, for example, objects associated with an object database 104. For example, the object database 104 may include a relational database. The address strings may then be retrieved in response to a query or request for information, and a response to the query or request may be advantageously determined based on parsing the address strings to determine relational paths associated with retrieval of objects, instead of stepping through a relational path by loading objects at each step of the path. Thus, for example, navigating a hierarchy of objects associated with a database may include parsing the stored address strings, without a need to load objects and step up an object tree one object at a time.

Although the following description refers primarily to the address string processing engine 102 as an example implementation, it should be understood that such address string processing engines may refer to any type of address string processing engine that generates and stores address strings associated with objects, and determines responses to requests for information associated with the objects based on retrieving and parsing the address strings.

In FIG. 1, the address string processing engine 102 is illustrated as including a query handler 106 that may receive, for example, a query or a request associated with a database. The query or request may, for example, be received by the query handler 106 from a user via a user interface 108. The query or request may include, for example, a request to add a new object to the object database 104, or it may include a request to update an existing object associated with the object database 104. The query or request may include a request for information associated with one or more objects associated with the object database 104. One skilled in the art of data processing will appreciate that there may be many different types of queries or requests for which a response may be determined based on storing and/or accessing objects associated with the object database 104.

If the query or request, for example, indicates a request to add a new object to the object database 104, the query handler 106 may generate the object and its unique identifier based on information associated with the query or request. In accordance with an example embodiment, an object address processor 110 may determine a location for storing the object, for example, in a table located in an object storage area 112 included in the object database 104. The determination of the location may be based on a determination of one or more relationships between the object and other entities included in the object database 104. For example, an example containment relationship for two example objects A and B may be defined such that A "contains" B if A is related to B, and if A is deleted then B is also deleted. For example, there may exist a containment relationship between an example object representing a student "Tom" and an example object representing a "Schedule" associated with the student "Tom" if it is true that deletion of the object representing the student "Tom" leads to deletion of the object representing the "Schedule" associated with the student "Tom."

Further, an example reference relationship for two example objects A and B may be defined such that A "refers" to B if A is related to B but A may be deleted without impacting B. For example, the example object representing the student "Tom" may include a reference relationship with an example course object representing a course for which "Tom" is enrolled. Moreover, an index relationship may exist for entities included in a list. For example, "C[5]" may indicate the fifth course for which "Tom" may be enrolled, out of at least five courses.

An example type relationship may exist, between an object and a type associated with the object. For example, the example object representing the student "Tom" may include an object type relationship with an example object type "Student."

After the object address processor 110 determines the location or direct address for storing the object based on the determination of the relationships, a storage engine 114 included in the address string processing engine 102 may then store the object at the location determined by the object address processor 110, for example, in the object storage area 112.

The address string processing engine 102 includes an address string generator 116 that may receive relational path information based on the determination of the relationships. The address string generator 116 may then generate one or more address strings representing relational paths associated with a database query retrieval of each object. The address strings may, for example, include human readable address strings representing the database relationships among the objects and other entities associated with the database, which may include navigation paths associated with navigating object trees for retrieving the objects based on database queries. The generated address strings for each object may then be stored by the storage engine 114 in an address string storage area 116 included in the object database 104. According to an example embodiment, an indicator of the location of the stored object, such as the unique identifier or an address, may also be stored in the address storage area 116, in association with the generated address strings.

According to an example embodiment, an example object may be assigned a human readable name. Further, an example object type, or ObjectType, may be assigned a human readable name. Thus, an object may be identified by a tuple including an "ObjectTypeName:ObjectName" format. According to an example embodiment, an example character or token such as ":" may be used to separate an ObjectType from an ObjectTypeName in an example address string. For example, as discussed above, a format "ObjectType:ObjectTypeName" may be used to represent an address of an object. Thus, an example string address "ObjectType1:Object1" may represent an address of an object named Object1 that is of type ObjectType1.

According to an example embodiment, an example character or token such as "." may be used to separate address string elements, and to indicate a containment relationship. Thus, an example string address "ObjectType1:Object1.OT2:Object2" may represent an address of Object2, and may indicate the Object2 is of type OT2, and is contained in an object named Object1 that is of type ObjectType1. Thus, ObjectType1:Object1 is related to OT2:Object2, and deletion of ObjectType1 Object1 will lead to a deletion of OT2:Object2.

According to an example embodiment, a token or symbol such as "→" may be used to separate address string elements, and to indicate a reference relationship. For example, an example string address "ObjectType1:Object1.OT2:Object2→OT3:Object3" may represent an address of Object3, and may indicate that the Object2 discussed above refers to an Object3 of type O3. Thus, ObjectType1:Object1.OT2:Object2 is related to OT3:Object3 but the object addressed by ObjectType1:Object1.OT2:Object2 may be deleted from storage without impacting OT3:Object3.

According to an example embodiment, an example token or symbol such as "[N]" may be placed after a string element to indicate a position in a list containment or reference relationship, wherein N may include, for example, a number. For example, an example string address "ObjectType1 Object1.OT2[N]:Object2" may represent an address of Object2, and may indicate that Object1 of type ObjectType1 contains Object2 of type OT2 at the "Nth" position in a list containment relationship.

Thus, according to an example embodiment, string addresses associated with an object may be generated in accordance with an example format as follows: ObjectTypeName1:ObjectName1.ObjectTypeName2:ObjectName2→ObjectTypeName3[2]:ObjectName3→ObjectTypeName4:ObjectName4 . . . ObjectTypeNameN:ObjectNameN The example format shown above may represent an object ObjectNameN of type ObjectTypeNameN on a relational path that includes an object ObjectName4 of type Object- TypeName4 that is referenced by an object ObjectName3 having a type that is a second type in a list of types ObjectTypeName3. The ObjectName3 may be referenced by an object ObjectName2 of type ObjectTypeName2 that is contained in an object ObjectName1 of type ObjectTypeName1.

According to an example embodiment, each object may be addressed via more than one string address; however, each string address may identify only one object. Therefore, there may exist multiple navigation paths to one object as discussed further below. One skilled in the art of data processing will appreciate that example techniques discussed herein may also apply to other types of relationships, and are not limited only to the relationships discussed above. The example techniques discussed herein may generally relate to an example generic "human readable" string addressing mechanism for objects in a software application so that each address identifies an object. However, one skilled in the art of data processing will also appreciate that these example techniques may also apply to strings that are not easily read by humans as well.

If the query or request received by the query handler 106, for example, indicates a query requesting information associated with the object database 104, the query handler 106 may determine a search based on address strings retrieved by a retrieval engine 118 from the address string storage area 116 associated with their associated objects stored in the object storage area 112. An address string parser 120 may then parse the retrieved strings to determine the relationships indicated by the address strings and the addresses of objects to be retrieved from the object storage area 112 by the retrieval engine 118. According to an example embodiment, the desired objects may be retrieved based on the associated indicators of the locations of the stored objects. In accordance with an example embodiment, the query handler 106 may then generate a response to the query or request based on the relationships and/or the retrieved objects.

Figure 2:
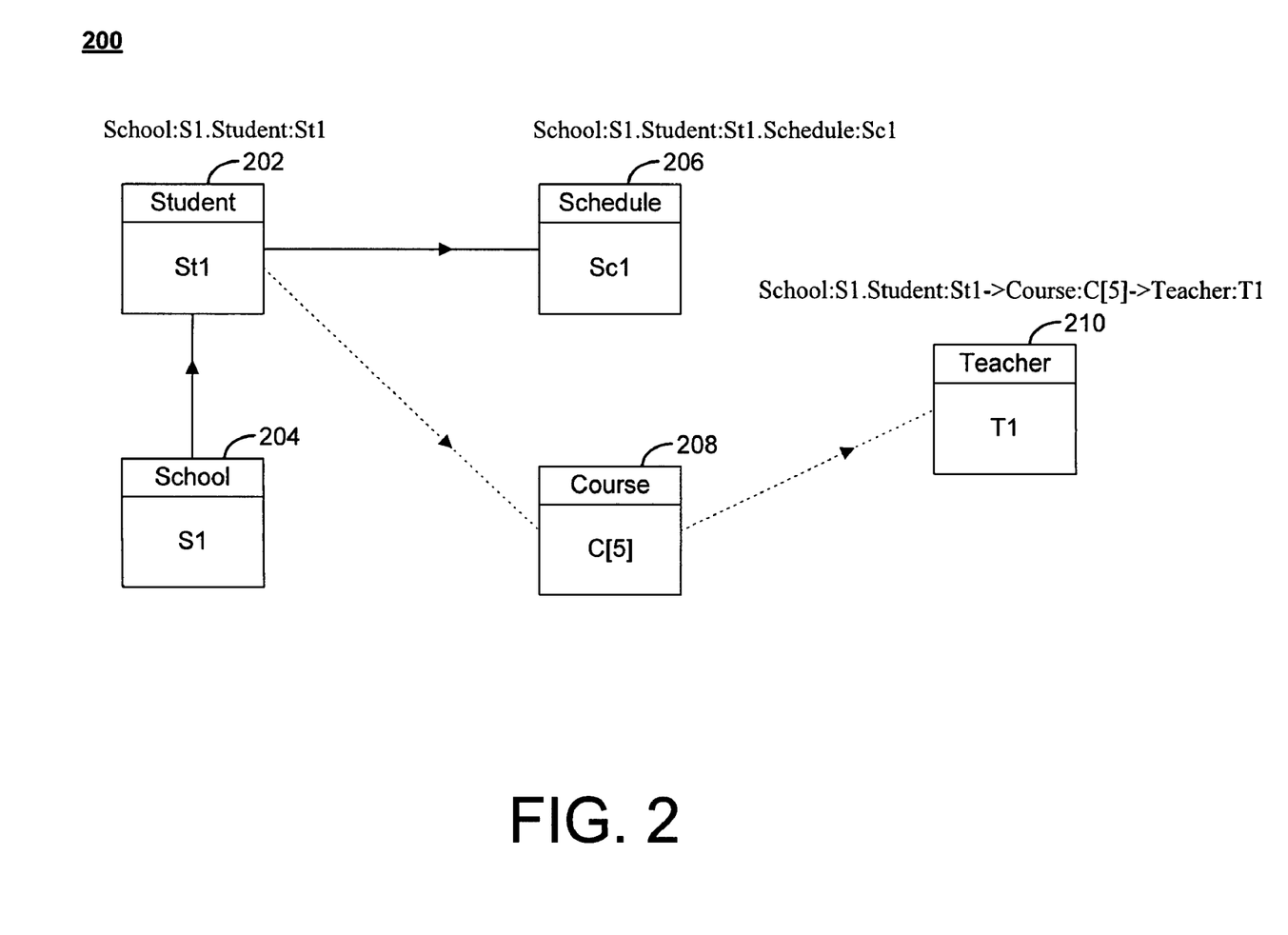
FIG. 2 is a block diagram that depicts an example schema illustrating example relationships among multiple example academic entities according to an example embodiment.

FIG. 2 depicts an example schema illustrating example relationships among multiple example academic entities according to an example embodiment. In the example of FIG. 2, a containment relationship is depicted by a directed solid line connecting the related entities, and a reference relationship is depicted by a directed dashed line. As shown in FIG. 2, a student St1 202 belonging to a school S1 204 has a schedule Sc1 206. The student St1 202 takes multiple courses, including a fifth course C[5] 208 which is taught by a teacher T1 210.

Using the example schema of FIG. 2 and the example string address generation techniques discussed previously, a string address for the student St1 202 may be generated as "School:S1.Student:St1" to provide a human-readable address. Similarly, a string address for the schedule Sc 1206 may be generated as "School:S1.Student:St1.Schedule:Sc1" to provide a human-readable address. A string address for the teacher T1 210 may be generated as "School:S1.Student:St1→Course:C[5]→Teacher:T1" to provide a human-readable address.

As another example, a second student, for example, student St2 may belong to the school S1 204, and may take a course C2, which may also be taught by the teacher T1 210. Thus, another string address for the teacher T1 210 may be generated as "School:S1.Student:St2→Course:C2→Teacher:T1" to provide another human-readable address. Thus, the different string addresses for the teacher T1 210 illustrate two different navigation paths through an object hierarchy from the School S1 204 to the teacher T1 210. In response to a query, for example, requesting all students enrolled in courses taught by the teacher T1 210, all such string addresses associated with the object associated with the teacher T1 210 may be retrieved, for example, by the retrieval engine 118 from address string storage 116, parsed by the address string parser 120 to determine the relational path, and processed by the query handler 106 to determine a response to the query. The string operations may significantly reduce retrieval time by reducing the amount of time spent in retrieving all objects at each level of an object hierarchy by relying on string operations instead.

An example query such as "Find all objects of Type A which contain in their hierarchy an object of type B with a certain value," for example, "Find all 'contracts' that have 'parties' with name 'SAP'" may be slow to process using conventional techniques because the conventional techniques may include the following steps:

A) find all objects of Type B with the value
B) navigate the hierarchy of B to get to A.

By using an example generic addressing mechanism as discussed herein it may be possible to issue a query such as "find all objects with a string address of the form: OtA:*.OtB:* with a certain value." Retrieval of objects of Type A may thus be performed via a one step process that may not require conventional programmatic hierarchical navigation or object loading.

Figure 3:
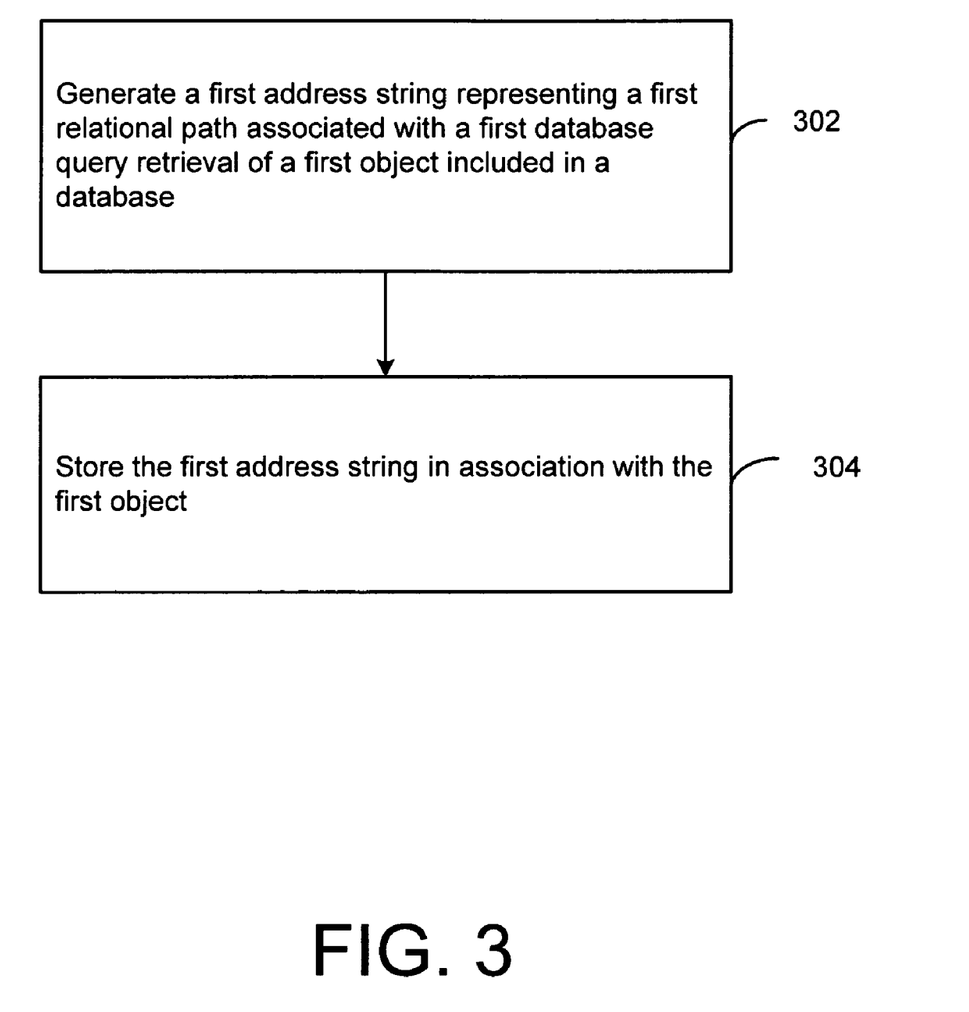
FIG. 3 is a flowchart illustrating an operation of the system of FIG. 1.

FIG. 3 is a flowchart illustrating an example operation of the system of FIG. 1. At 302, a first address string representing a first relational path associated with a first database query retrieval of a first object included in a database may be generated. For example, the address string "School:S1.Student:St1→Course:C[5]→Teacher:T1" as discussed previously may be generated by the example address string generator 116. The example address string represents a relational path through the school S1 204, the student St1 202, the course C[5] 208, and the teacher T1 210, as discussed previously.

At 304, the first address string may be stored in association with the first object. For example, the example address string may be stored in the address string storage area 116 by the storage engine 114 as discussed previously. The example address string may be stored in association with the corresponding object stored in the object storage area 112, such as the object representing the teacher T1 210. For example, if all address strings are stored in association with their corresponding objects, then determinations of responses to queries may advantageously be performed more quickly and efficiently by performing operations on strings rather than by loading objects and programmatically navigating an object hierarchy.

Figure 4:
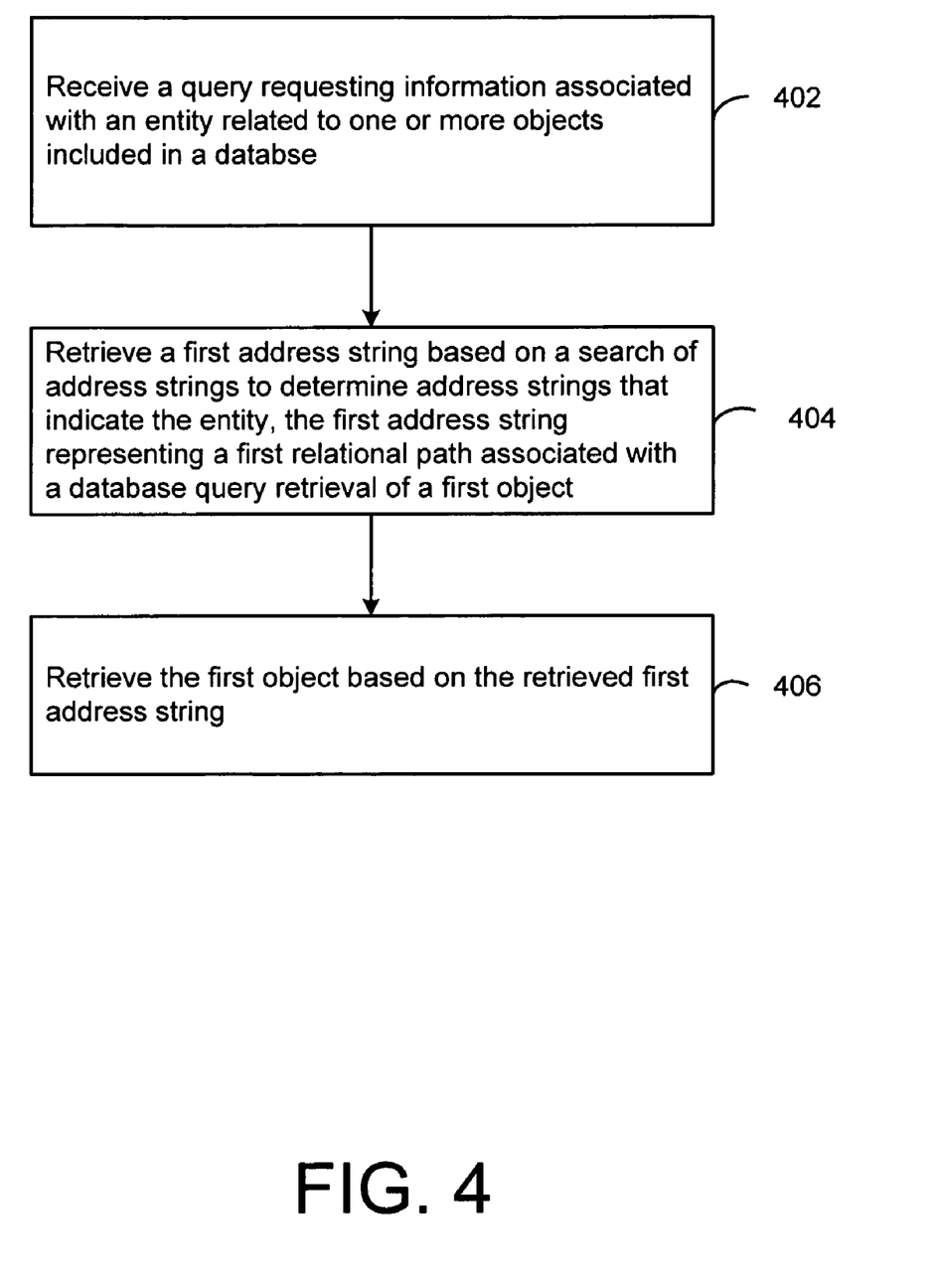
FIG. 4 is a flowchart illustrating an operation of the system of FIG. 1.

FIG. 4 is a flowchart illustrating an example operation of the system of FIG. 1. At 402, a query requesting information associated with an entity related to one or more objects included in a database may be received. For example, a query may be received by the example query handler 106.

At 404, a first address string may be retrieved based on a search of address strings to determine address strings that indicate the entity, the first address string representing a first relational path associated with a database query retrieval of a first object. For example, the retrieval engine 118 may retrieve all address strings from the address string storage area 116 that are associated with a particular object, or that indicate a particular entity based on the query.

At 406, the first object may be retrieved based on the retrieved first address string. For example, the first object may be retrieved by the retrieval engine 118 from the object storage area 112 based on a determination made by the query handler 106 that the first object needs to be retrieved based on operations performed on the first address string.

Figure 5:
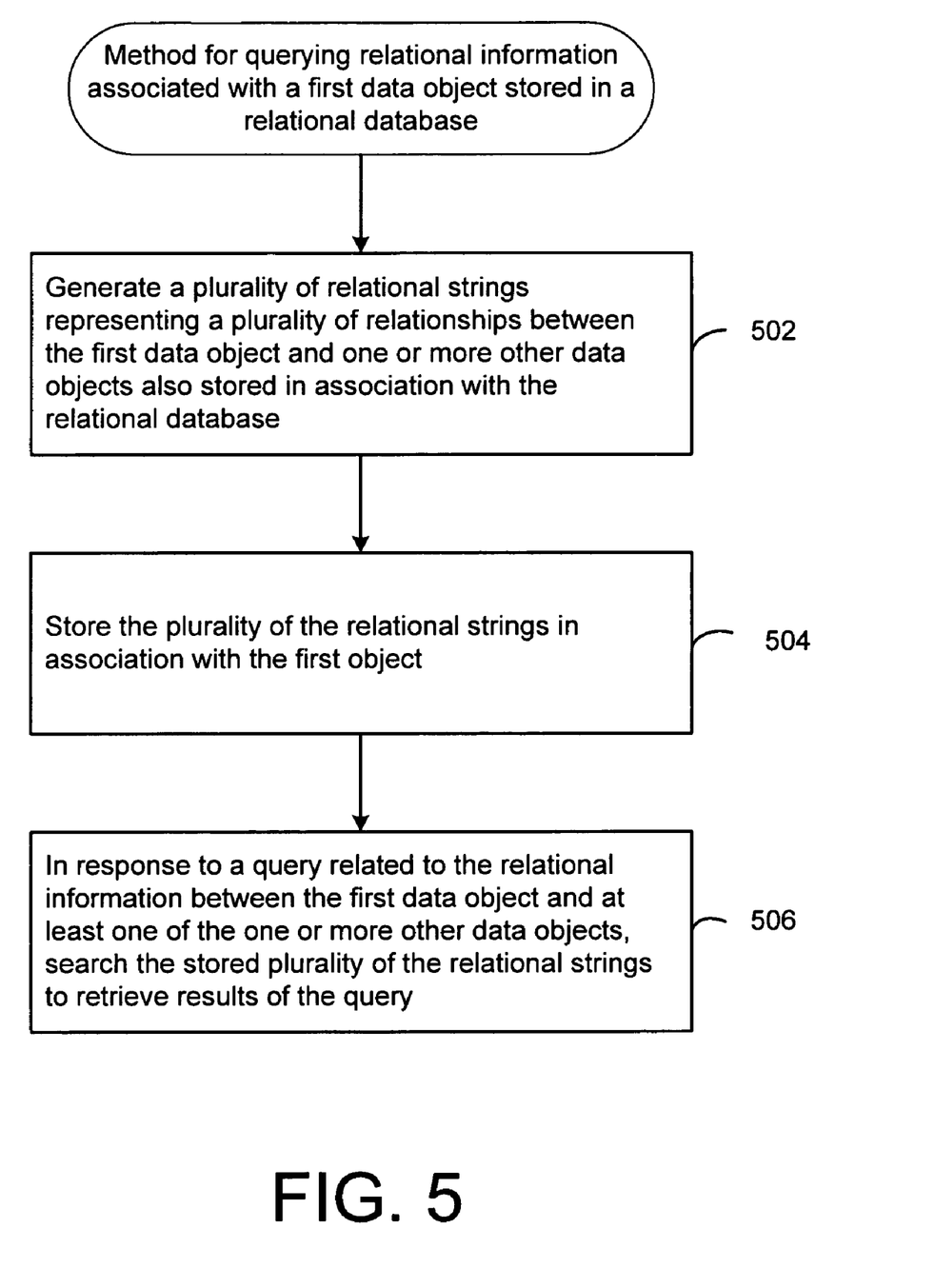
FIG. 5 is a flowchart illustrating an operation of the system of FIG. 1.

FIG. 5 is a flowchart illustrating an example operation of the system of FIG. 1. More particularly, FIG. 5 is a flowchart illustrating an example operation for querying relational information associated with a first data object stored in a relational database. At 502, a plurality of relational strings representing a plurality of relationships between the first data object and one or more other data objects also stored in association with the relational database may be generated. For example, the example address string "School:S1.Student:St1→Course:C[5]→Teacher:T1" as discussed previously may be generated by the example address string generator 116. The example address string represents a plurality of relationships between the teacher T1 210 and one or more other data objects such as the school S1 204, the student St1 202, and the course C[5] 208, as discussed previously. Further, the example address string "School:S1.Student:St2→Course:C2→Teacher:T1" as discussed previously may be generated by the example address string generator 116. The example address string represents a plurality of relationships between the teacher T1 210 and one or more other data objects such as the school S1 204, a student St2, and a course C2, as discussed previously At 504, the plurality of the relational strings may be stored in association with the first object. For example, the example address strings may be stored in the address string storage area 116 by the storage engine 114 as discussed previously. The example address strings may be stored in association with the corresponding object stored in the object storage area 112, such as the object representing the teacher T1 210.

At 506, in response to a query related to the relational information between the first data object and at least one of the one or more other data objects, the stored plurality of the relational strings may be searched to retrieve results of the query. For example, a query may be received by the example query handler 106. For example, the first object may be retrieved by the retrieval engine 118 from the object storage area 112 based on a determination made by the query handler 106 that the first object needs to be retrieved based on operations performed on the stored address strings.

Figure 6:
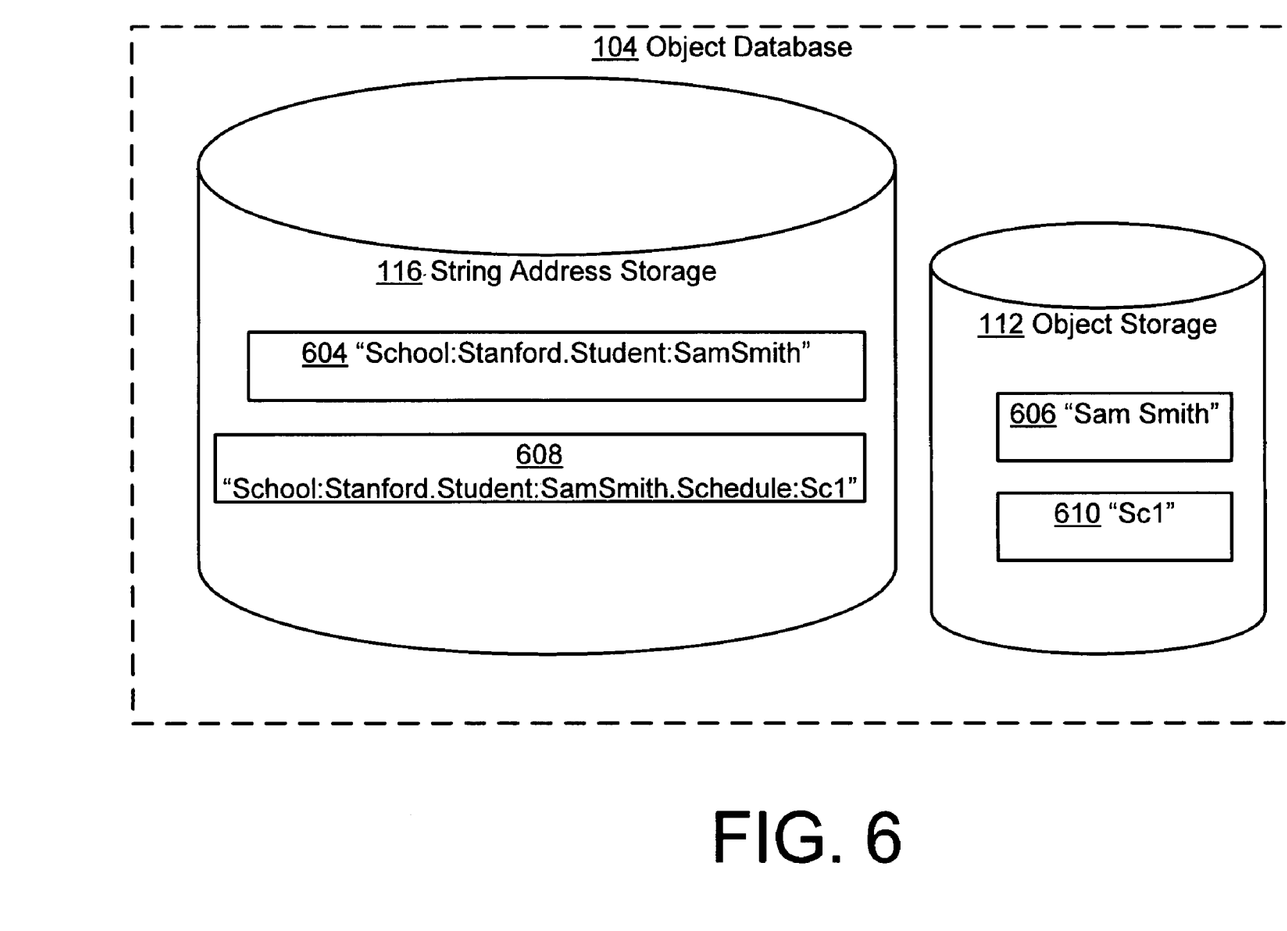
FIG. 6 is a block diagram that illustrates example strings and example stored objects associated with an object database according an example embodiment.

FIG. 6 illustrates example strings that may be stored in the string address storage area 116 and the object storage area 112. For example, a string address 604 illustrating a student "Sam Smith" contained in a school "Stanford" is stored in association with an object 606 representing student "Sam Smith." As another example, a string address 608 illustrating a schedule "Sc1" contained in a student "Sam Smith" contained in a school "Stanford" is stored in association with an object 610 representing schedule "Sc1." As discussed previously, more than one address string may identify a particular object, but each address string may identify one and only one object. An example address string may indicate: a) a 1-1 or unordered 1-n containment relationship; b) a 1-1 or unordered 1-n reference relationship; and/or c) a position of a containment or referred relationship if there exists an ordered 1-n or m-n relationship.

According to an example embodiment based on human readable strings, a human may advantageously be provided with meaningful, human readable navigation paths to each object in a software application, whereas conventional addressing mechanisms may either provide non-meaningful unique identifiers or may not capture the complete position of an object in an object hierarchy.

Further, according to an example embodiment, for each object stored in an object repository, all possible means of access to the object either in a containment or a reference relationship may advantageously be stored, for example, via address strings.

Moreover, according to an example embodiment, navigation of the object tree may advantageously be performed via a string operation, rather than conventional operations that may include loading objects into memory and programmatically walking the object hierarchy.

For applications that use relational data, the example object addressing techniques discussed herein may advantageously improve retrieval performance generally. For example, if all address strings for each object are stored in the object database 104, a lookup on the object may be performed much faster, for example, via operations on the strings. Further, as discussed previously, navigating a hierarchy of objects may also be achieved by parsing strings instead of loading objects and moving up an object tree one loaded object at a time.

It is possible that operations for creating objects, based on example techniques discussed herein, may execute slower than conventional techniques; however, this may be diminished by using example optimization techniques such as asynchronous calls. However, retrieval of object trees may become relatively fast. Thus, applications that are designed more for consumption of data may advantageously benefit from the example techniques discussed herein.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD)

monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the embodiments of the invention.

What is claimed is:

1. A method comprising:
generating, by a processor, a first address string based on a set of attributes of a first object included in a database and a set of attributes of a second object included in the database, the set of attributes of the first object containing the second object and the set of attributes of the second object referencing a third object from the database, the first address string indicating, based on the set of attributes of the first object containing the second object and the set of attributes of the second object referencing the third object, a first relationship that deletion of the first object from the database will lead to deletion of the second object and a second relationship that deletion of the second object will not lead to deletion of the third object;
storing the first object in a first location in an object storage area associated with the database;
storing the second object in a second location in the object storage area, the second location being based on the first relationship indicated by the first address string;
storing the third object in a third location in the object storage area, the third location being based on the second relationship indicated by the first address string; and
storing the first address string in an address string storage area in association with the first object, the first address string including a first indicator of the first location, a second indicator of the second location, and a third indicator of the third location.

2. The method of claim 1 comprising:
receiving a request to update the database;
generating the first object including information associated with the request;
storing the first object in the object storage area; and
determining a first relational path based on a navigation path associated with navigating an object tree for retrieving the first object based on a first database query.

3. The method of claim 1 wherein the first object is included in a relational database.

4. The method of claim 1 wherein generating the first address string comprises generating the first address string representing a first relational path associated with a first database query retrieval of the first object, wherein the first relational path represents a navigation path associated with navigating an object tree for retrieving the first object based on the first database query.

5. The method of claim 1 comprising:
receiving a query requesting information associated with the third object specified in the first address string;
retrieving the first address string based on a search of address strings to determine address strings that indicate the third object; and
retrieving the first object based on the retrieved first address string.

6. The method of claim 1, further comprising:
receiving a query for all objects having a specified relationship with the third object;
retrieving the first address string based on the query, the first address string indicating:
the first relationship between the first object and the second object;
the second relationship between the second object and the third object; and
the second location of the second object; and
retrieving the second object from the second location.

7. The method of claim 1, comprising:
generating a second address string, the second address string based on the set of attributes of the first object and the set of attributes of the second object, the set of attributes of the first object containing the second object and the set of attributes of the second object containing a fourth object, the second address string indicating, based on the set of attributes of the first object containing the second object and the set of attributes of the second object containing the fourth object, a third relationship that deletion of the first object from the database will lead to deletion of the second object and a fourth relationship that deletion of the second object will lead to deletion of the fourth object;
storing the fourth object in a fourth location in the object storage area, the fourth location being based on the fourth relationship indicated by the second address string; and
storing the second address string in the address string storage area, the second address string including the first indicator of the first location, the second indicator of the second location, and a fourth indicator of the fourth location.

8. The method of claim 7 wherein:
the first object represents a school;
the second object represents a student enrolled in the school;
the third object represents a course taken by the student; and
the fourth object represents a schedule of courses in which the student is enrolled, including the course represented by the third object.

9. The method of claim 7, comprising:
generating a third address string, the third address string based on the set of attributes of the first object, the set of attributes of the second object, and a set of attributes of the third object, the third string address indicating, based on the set of attributes of the first object containing the second object, the set of attributes of the second object referencing the third object, and the set of attributes of the third object referencing a fifth object, the first relationship that deletion of the first object from the database will lead to deletion of the second object, the second relationship that deletion of the second object from the database will not lead to deletion of the third object, and a fifth relationship that deletion of the third object will not lead to deletion of the fifth object;

storing the fifth object in a fifth location in the object storage area, the fifth location being based on the fifth relationship indicated by the third address string; and storing the third address string in the address string storage area, the third address string including the first indicator of the first location, the second indicator of the second location, the third indicator of the third location, and a fifth indicator of the fifth location.

10. The method of claim 9 wherein:
the first object represents a school;
the second object represents a student enrolled in the school;
the third object represents a course taken by the student;
the fourth object represents a schedule of courses in which the student is enrolled, including the course represented by the third object; and
the fifth object represents a teacher teaching the course taken by the student.

11. The method of claim 1 wherein:
the first object represents a school;
the second object represents a student; and
the third object represents a course taken by the student.

12. A method comprising:
receiving, by a processor, a query requesting one or more non-identified objects, the one or more non-identified objects being associated with an identified object;
retrieving, from a string address storage area, a first address string based on a search for address strings that indicate the identified object, the first address string indicating:
an identity of each of the identified object, a second object, and a third object;
a location in the object storage area of each of the identified object, the second object, and the third object;
a first relational path associated with a database query retrieval of the identified object, the second object, and the third object;
an indication that deleting the second object from the object storage area will lead to deletion of the third object from the object storage area;
an indication that deleting the third object from the storage area will not lead to deletion of the identified object from the storage area; and
retrieving the second object or the third object based on the location in the object storage area indicated by the retrieved first address string.

13. The method of claim 12 wherein the first address string represents a navigation path associated with navigating an object tree for retrieving the identified object, the second object, and the third object based on the database query.

14. A method for querying relational information associated with a first data object, a second data object, and a third data object stored in an object storage area, the method comprising:
generating, by a processor, a first relational string based on a set of attributes of the first data object and a set of attributes of the second data object, the set of attributes of the first data object identifying a relationship between the first data object and the second data object and the set of attributes of the second data object identifying a relationship between the second data object and the third data object, the relational string indicating:

that deletion of the first data object will lead to deletion of the second data object;
that deletion of the second data object will not lead to deletion of the third data object;
a first location of the first data object in the object storage area;
a second location in the object storage area for the second data object, the second location being based on the first location and the relationship between the first data object and the second data object; and
a third location in the object storage area for the third data object, the third location being based on the relationship between the second data object and the third data object;

storing a plurality of relational strings in an address string storage area, the plurality of relational strings including the first relational string;
storing the first data object in the first location;
storing the second object in the second location;
storing the third data object in the third location; and
in response to a query related to relational information associated with the third data object, searching the stored plurality of the relational strings to retrieve the first relational string, the first relational string indicating:
the first and second data objects related to the third data object;
the relationships between the first and second data objects and between the second and third data objects; and
the locations of each of the first, second, and third data objects.

15. A system comprising:
a processor coupled to a memory, the processor being configured to:
generate a first address string based on a set of attributes of a first object included in a database of the memory and a set of attributes of a second object included in the database, the set of attributes of the first object containing the second object and the set of attributes of the second object referencing a third object, the first address string indicating, based on the set of attributes of the first object containing the second object, a first relationship that deletion of the first object from the database requires also deleting the second object, the first address string also indicating, based on the set of attributes of the second object referencing the third object, a second relationship that deletion of the second object from the database does not require deleting the third object;
store the first object in a first location in an object storage area associated with the database;
store the second object in a second location in the object storage area, the second location being based on the first relationship indicated by the first address string;
store the third object in a third location in the object storage area, the third location being based on the second relationship indicated by the first address string; and
store the first address string in an address string storage area associated with the database in association with the first object, the first address string including a first indicator of the first location, a second indicator of the second location, and a third indicator of the third location.

16. The system of claim 15 wherein the processor is configured to generate the first address string representing a first relational path associated with a first database query retrieval of the first object, wherein the first relational path represents a navigation path associated with navigating an object tree for retrieving the first object based on the first database query retrieval.

17. The system of claim 15 wherein the processor is configured to parse the first address string to determine a first relational path between the first object, the second object, and the third object.

18. The system of claim 17 wherein the processor is configured to determine the first location of the first object based on the first relational path.

19. The system of claim 15, wherein the processor is further configured to:
receive a query for all objects having a specified relationship with the third object;
retrieve the first address string based on the query, the first address string indicating:
the first relationship between the first object and the second object;
the second relationship between the second object and the third object; and
the second location of the second object; and
retrieve the second object from the second location.

20. A computer program product being stored on a non-transitory computer-readable medium and being configured to cause a data processing apparatus to:
generate a first address string based on a set of attributes of a first object included in a database and a set of attributes of a second object included in the database, the set of attributes of the first object containing the second object from the database and the set of attributes of the second object referencing a third object from the database, the first address string indicating, based on the set of attributes of the first object containing the second object, a first relationship that deleting the first object from the database requires also deleting the second object from the database, and based on the set of attributes of the second object referencing the third object, a second relationship that deleting the second object from the database does not require deleting the third object from the database;
store the first object in a first location in an object storage area associated with the database;
store the second object in a second location in the object storage area, the second location being based on the first relationship indicated by the first address string;
store the third object in a third location in the object storage area, the third location being based on the second relationship indicated by the first address string; and
store the first address string in an address string storage area associated with the database in association with the first object, the first address string including a first indicator of the first location, a second indicator of the second location, and a third indicator of the third location.

21. The computer program product of claim 20 wherein the first address string indicates a navigation path associated with navigating an object tree for retrieving the first object based on a first database query.

22. The computer program product of claim 20, further configured to cause the data processing apparatus to:
receive a query for all objects having a specified relationship with the third object;
retrieve the first address string based on the query, the first address string indicating:
the first relationship between the first object and the second object;
the second relationship between the second object and the third object; and
the second location of the second object; and
retrieve the second object from the second location.

23. A method comprising:
generating, by a processor, a first address string based on a set of attributes of a first object included in a database and a set of attributes of a second object included in the database, the set of attributes of the first object containing the second object and the set of attributes of the second object referencing a third object from the database, the first address string indicating, based on the set of attributes of the first object containing the second object and the set of attributes of the second object referencing the third object, a first relationship that deletion of the first object from the database will require deletion of the second object and a second relationship that deletion of the second object will not require deletion of the third object;
storing the first object in a first location in an object storage area associated with the database;
storing the second object in a second location in the object storage area, the second location being based on the relationship indicated by the first address string;
storing the third object in a third location in the object storage area, the third location being based on the second relationship indicated by the first address string;
storing the first address string in an address string storage area in association with the first object, the first address string including a first indicator of the first location, a second indicator of the second location, and a third indicator of the third location;
receiving a query requesting information associated with the third object specified in the first address string;
retrieving the first address string based on a search of address strings to determine address strings that indicate the third object; and
retrieving the first object based on the retrieved first address string.

24. A method comprising:
generating, by a processor, a first address string based on a set of attributes of a first object included in a database and a set of attributes of a second object included in the database, the set of attributes of the first object containing the second object and the set of attributes of the second object referencing a third object from the database, the first address string indicating, based on the set of attributes of the first object containing the second object and the set of attributes of the second object referencing the third object, a first relationship that deletion of the first object from the database will require deletion of the second object and a second relationship that deletion of the second object will not require deletion of the third object;
storing the first object in a first location in an object storage area associated with the database;
storing the second object in a second location in the object storage area, the second location being based on the relationship indicated by the first address string;
storing the third object in a third location in the object storage area, the third location being based on the second relationship indicated by the first address string;
storing the first address string in an address string storage area in association with the first object, the first address string including a first indicator of the first location, a second indicator of the second location, and a third indicator of the third location;

receiving a query requesting information associated with the third object specified in the first address string;

retrieving the first address string based on a search of address strings to determine address strings that indicate the third object; and retrieving the second object based on the retrieved first address string.

* * * * *